United States Patent

[11] 3,591,183

| [72] | Inventor | James W. Ford |
| | | Nashville, Tenn. |
| [21] | Appl No | 829,037 |
| [22] | Filed | May 29, 1969 |
| [45] | Patented | July 6, 1971 |
| [73] | Assignee | True Temper Corporation |
| | | Cleveland, Ohio |

[54] LAMINATED GOLF CLUB HEAD
5 Claims, 6 Drawing Figs.

[52] U.S. Cl. .................................................. 273/167,
144/316
[51] Int. Cl. ..................................... A63b 53/04
[50] Field of Search ................................ 273/67, 68,
72, 73, 77, 167, 169, 171, 82, 78; 124/23

[56] References Cited
UNITED STATES PATENTS

| 1,567,323 | 12/1925 | Jordan.......................... | 273/77 |
| 2,307,193 | 1/1943 | Bellis............................. | 273/78 |
| 2,413,912 | 1/1947 | Dosker......................... | 273/82 UX |
| 3,455,558 | 7/1969 | Onions.......................... | 273/169 |

FOREIGN PATENTS

| 410,876 | 5/1934 | Great Britain................ | 273/67 |
| 485,068 | 5/1938 | Great Britain................ | 273/67 |

Primary Examiner—Richard C. Pinkham
Assistant Examiner—Richard J. Apley
Attorney—J. H. Slough ABSTRACT: A golf club head is constructed of wood laminations bonded together and bent to form the angle between striking portion and hosel. The grain of each lamination is disposed at an angle of approximately 7½° with respect to the centerline of the hosel as seen from the front of the golf club, and the grain of each lamination is angled oppositely with respect to the grain of the next adjacent lamination. The grain of certain of the laminations are disposed substantially parallel with one lateral side of the hosel; the grain of the adjacent laminations are disposed substantially parallel with the opposite lateral side of the hosel.

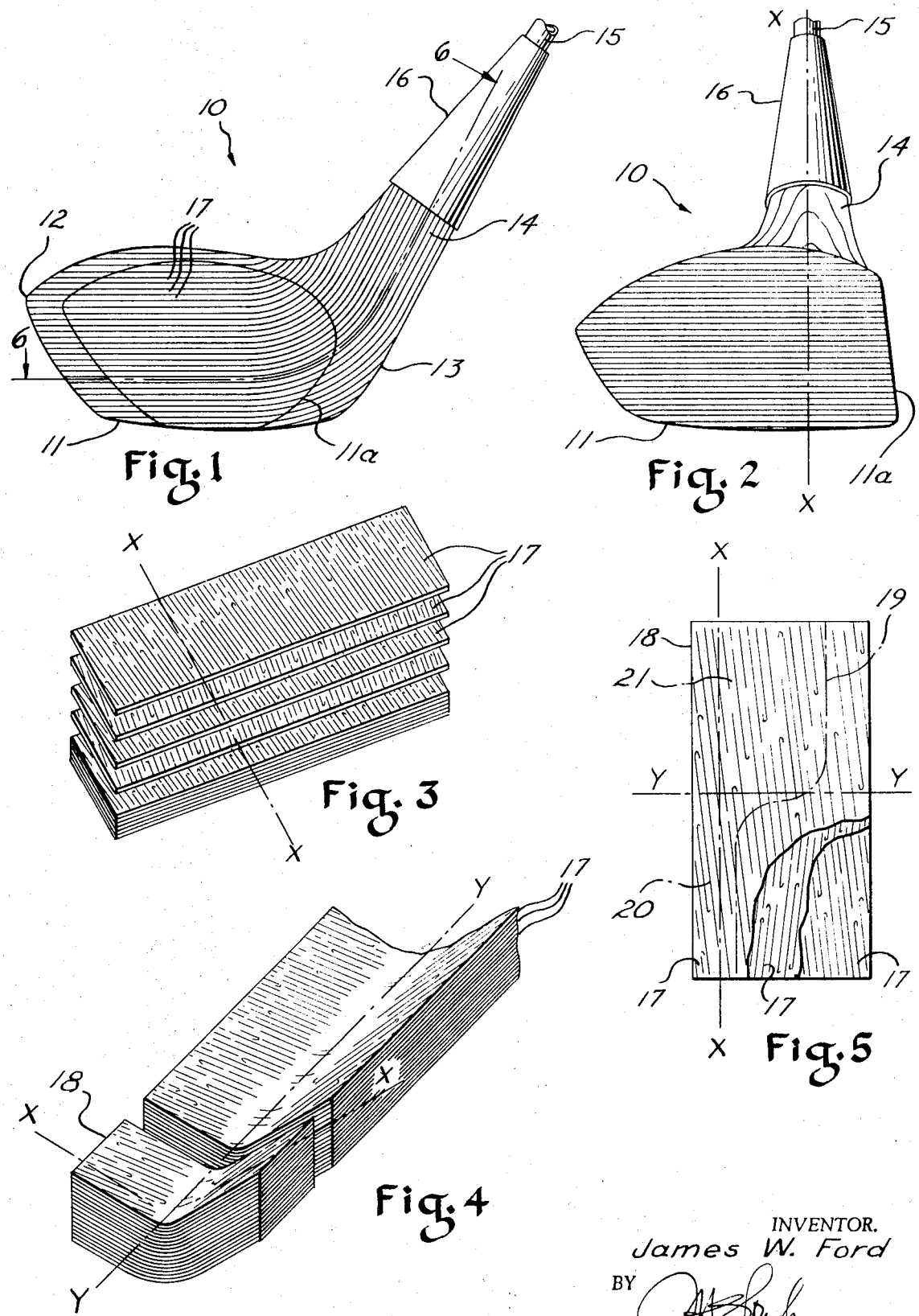

LAMINATED GOLF CLUB HEAD

BACKGROUND OF THE INVENTION

This invention relates to golf clubs and particularly to a golf club head of laminated wood construction.

Wood laminated golf club heads generally comprise a stack or bundle of wood veneer bonded and compressed together and bent to a shape roughly conforming to the normal angle between the striking portion and hosel of a golf club head. The laminated material on one side of the bend is then shaped to form the striking portion while the material on the other side of the bend is shaped to provide an integral hosel. In some known constructions, the grain in different of the laminations is disposed at approximately right angles to each other, and the club head is so formed that the striking face presents a combination of edge grain and end grain to the ball. This combination of edge and end grain extends upwardly into the hosel where the laminations are generally parallel with the axis of said hosel. Another usual construction is to place the laminations with the grain thereof all running in the same direction whereby only edge grain is presented at the side or striking surface of the club and said grain is all disposed longitudinally of the hosel. Where the grains of the different laminations are placed at right angles to each other, difficulty is encountered in machining the head due to the fact that end grain is likely to be encountered in almost any direction. Heads presenting all edge grain at the striking surface can be more easily machined since the grains all run the same direction and can be routed and milled with less likelihood of splitting or tearing. The right angular grain construction is substantially resistant to longitudinal cleavage or splitting lengthwise of the hosel since the grain of a number of the pieces run crosswise of the hosel and tend to lock them together. However, the laminations which provide the cross-grain; that is, those which provide end grain at the striking face, contribute very little resistance to a force parallel to their grain such as that generated by striking of the ball, ground, or other objects. Golf club heads wherein the grain of all the laminations is parallel and wherein only edge grain is presented to the striking surface are quite resistant to forces perpendicular to their grain, such as would be encountered by striking of the ball, but have a minimum resistance to forces from other directions that might produce cleavage in the head and particularly the hosel.

SUMMARY OF THE INVENTION

The present invention comprises a laminated golf club head wherein the laminations are placed with the grain thereof disposed at a slight angle to the intended centerline of the hosel or shaft. The grain of certain laminations is angled to one side of said centerline whereas the grain of other of said layers is angled to the other side of said centerline, the grains crossing each other at an acute angle. The stack of laminations is then bonded and pressed together and bent to the proper angle along a line disposed at right angles to the proposed centerline of the hosel or shaft. The golf club head is then machined from the bent stack of laminations or a block of suitable size cut from the stack.

Machining of a golf club head of the present invention affords all the advantages realized with the all edge grain heads as there is a minimum of cutting across end grain. However, the angled grain construction of the present invention results in tying or crossbanding effect of the grain which greatly increases resistance to cleavage while at the same time providing a substantial portion of the grain structure running the full length of the hosel. The intersecting angle of the grains preferably corresponds generally to an angular upward taper of the hosel whereby the majority of the grains in the hosel area will extend completely throughout the length of said hosel. At the same time, the grain in this area will have the benefit of the crossbanding effect thereby providing a maximum resistance to side forces such as those encountered when the club strikes a ball, the ground, or other objects. A golf club according to the present invention also presents a striking and attractive appearance similar to that of natural wood at the sides of the club in the area of the striking face.

An object of the present invention is to provide an improved golf club head of laminated wood construction which provides greater resistance to forces applied from any direction.

Still another object is to provide a golf club head as set forth above which provides all the advantages for machining of edge grain heads and also provides a crossbanding effect between grains of the various laminations.

Still another object of the invention is to provide a golf club head having the above features and characteristics which also provides an attractive appearance similar to that of natural wood.

DESCRIPTION OF THE DRAWINGS

FIG. 1 is a side view of the golf club head of this invention as seen from the striking face thereof;

FIG. 2 is a front view of the head as seen from the left-hand side of FIG. 1;

FIG. 3 is an exploded view showing a plurality of wood laminations in process of assembly;

FIG. 4 is a view showing the laminations of FIG. 3 bonded and compressed together with a first block being cut therefrom;

FIG. 5 is an enlarged top plan view of the block of FIG. 4 with certain layers of the laminations thereof being cut away for clarity.

DESCRIPTION OF THE PREFERRED EMBODIMENT

Figure 6:
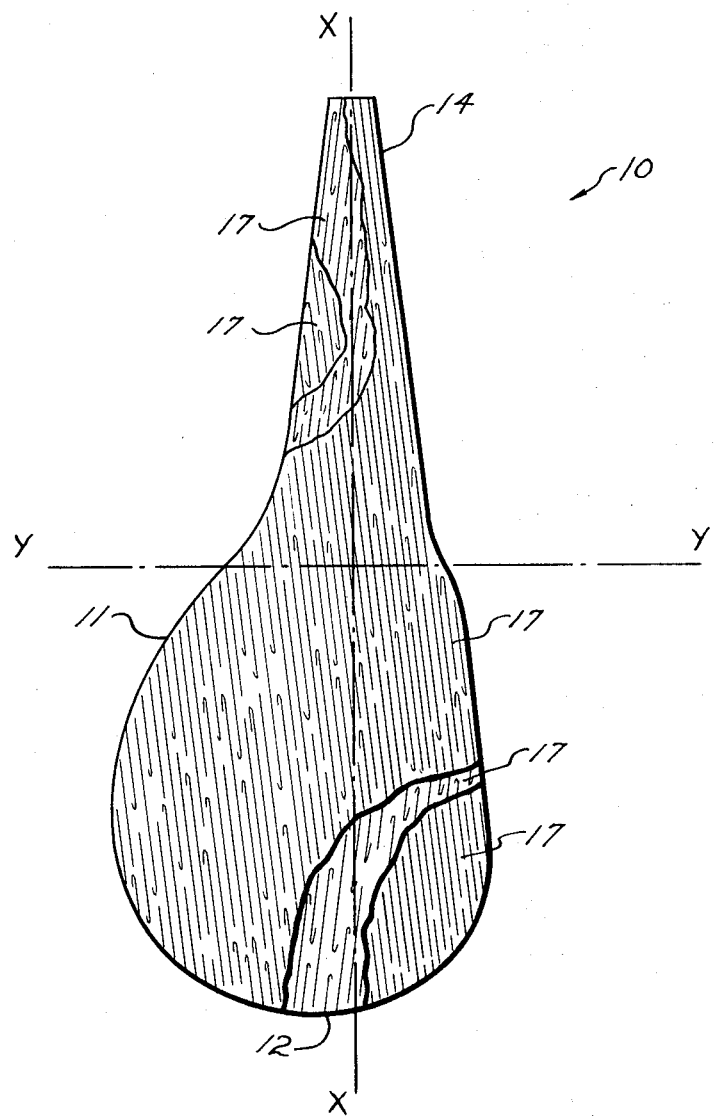
FIG. 6 is a view taken along the line 6—6 of FIG. 1, certain layers of the laminations being cut away in the manner of FIG. 5 to show the grain angle in a finished golf club head.

Referring now to the drawings in all of which like parts are designated by like reference numerals, the golf club head of this invention is generally indicated at 10 and comprises a striking body portion 11 having a forwardly directed toe 12, a rearwardly directed heel 13, a laterally facing striking surface 11a and an upwardly and rearwardly angled hosel portion 14. A portion of the golf club shaft is shown at 15, and it will be understood that the same is connected to the hosel 14 in a well-known manner. In the form of the invention herein illustrated, a ferrule 16 is disposed at the lower end of the shaft 15 adjacent to the upper end portion of the hosel 14.

The construction of the golf club head 10 is best understood by reference to FIGS. 3—5 illustrating the method by which i it is made. As shown in FIG. 3, rectangular laminations 17 of rotary cut wood veneer are so trimmed that the longitudinal grain of wood is disposed approximately 7½° off of a centerline indicated at X–X. The laminations are assembled with alternate sheets so placed that the grain angle is alternately disposed to the right or left of the centerline X—X. Therefore, said centerline X—X represents a medial line between the angled grain of the different laminations and may be taken at any point laterally along the bundle or stack of laminations shown in FIG. 3.

The laminations 17 are provided in a stack of sufficient thickness for the manufacture of a golf club head and are then pressed and bonded together and bent in a direction perpendicular to the planes of the laminations along a line Y–Y disposed at right angles to a line X–X whereby the stack has the angled configuration illustrated in FIG. 4. As shown, the stack of lamination 17 is preferably elongated in the lateral direction of the line Y–Y whereby the same can be cut into blocks such as that indicated at 18. The enlarged detail of FIG. 5 illustrates the form of the block 18 which is generally rectangular in plan view and comprises a plurality of laminations the grain angles of which are alternately disposed approximately 7½° on either side of a centerline X–X through the block. Said block is then rough cut as indicated by the broken line 19 to provide blanks having the rough form of a golf club head of the wood type. The golf club head 10 of this invention is completed by machining of the rough blank with a narrow portion 20 of the blank on one side of the bend Y-Y becoming the hosel portion 14 and a wider portion 21 on the other side of said bend becoming the striking body portion of the head. It will be noted in FIG. 2 that the centerline of the hosel is disposed parallel with a centerline X-X whereby the veneer grain in the hosel is alternately symmetrically angled on either side of the centerline of the hosel as seen generally from the front.

As shown in FIGS. 1 and 2, in the finished golf club head 10 the laminations 17 are disposed generally horizontally in the body portion 11 when said club head is in its normal position relative to the ground. Said laminations curve upwardly and into the hosel portion 14 whereby the grain structure is continuous throughout the head. As illustrated at the narrow portion 20 in FIG. 5, due to the shallowness of the grain angle, substantially all of the grain in the hosel extends the full length of said hosel thereby providing great lateral strength in this area. This is particularly important in view of the fact that the force required to rupture wood across the grain is up to 10 times that required to rupture it with or longitudinally of the grain. As herein illustrated, the taper of the hosel defines an included angle of approximately 15° whereby the grain angles are substantially parallel with one of the sides of said hosel. With the present construction, all laminations of the head provide grain structure extending the full length of the hosel in a longitudinal direction thereby giving the hosel great strength with respect to side forces and twisting forces applied thereto when the club strikes a ball or other object. This grain structure is further reinforced by the grain of adjacent laminations overlying each other at an angle whereby the grain of one lamination resists cleavage of the grain of another lamination. The very acute angle of the grain also facilitates machining of the blank with less likelihood of splitting or tearing the wood.

What I claim is:

1. A golf club head comprising a striking body portion having a forwardly projecting toe, a rearwardly disposed heel, a laterally facing striking surface, and an upwardly tapering, integral hosel portion disposed adjacent to said heel and projecting rearwardly and upwardly at an angle therefrom; said head comprising a plurality of wood laminations bonded together in a stack and bent in a direction perpendicular to the planes of the laminations to provide the normal angle between the striking body portion and hosel portion of a golf club head, the portion of said stack on one side of the bend being shaped into said body portion and the portion of said stack on the other side of the bend being shaped into said tapered hosel; the grain of each lamination being disposed at an angle to the right or left with respect to a centerline of said hosel as seen from the forwardly and upwardly facing side of said hosel, the grain of certain of said laminations being angled with respect to said centerline and disposed substantially parallel with one lateral side of said tapered hosel and the grain of the other said laminations being angled in the opposite direction with respect to said centerline and disposed substantially parallel with the opposite lateral side of said tapered hosel, and wherein the relative grain angles of said certain and said other laminations extending around the bend of said stack and into said striking body portion.

2. A golf club head as set forth in claim 1: said stack of laminations comprising alternately one of said certain laminations and one of said other laminations whereby grains of adjacent laminations cross each other at an angle.

3. A golf club head as set forth in claim 1: said hosel being tapered upwardly at an included angle of substantially 15° and the grain of said laminations being disposed at an angle of substantially 7½° with respect to the centerline of said hosel as seen from the forwardly and upwardly facing side of said hosel.

4. A golf club head as set forth in claim 3: said stack of laminations comprising alternately one of said certain laminations and one of said other laminations whereby grains of adjacent laminations cross each other at an angle of substantially 15°.

5. A golf club head comprising a striking body portion having a forwardly projecting toe, a rearwardly disposed heel, a laterally facing striking surface, and an integral hosel portion disposed adjacent to said heel and projecting generally rearwardly and upwardly therefrom; said head comprising a plurality of wood laminations bonded together in a stack and bent in a direction perpendicular to the planes of the laminations to provide the normal angle between the striking body portion and the hosel portion of a golf club head, the portion of said stack on one side of the bend being shaped into said body portion and the portion of said stack on the other side of the bend being shaped into said hosel; the grain of each lamination being disposed at an angle of substantially 7½° with respect to the centerline of said hosel as seen from the forwardly and upwardly facing side of said hosel, the grain of certain of said laminations being angled with respect to said centerline and disposed substantially parallel with one lateral side of said hosel and the grain of certain other of said laminations being angled in the opposite direction with respect to said centerline and disposed substantially parallel with the opposite lateral side of said tapered hosel and wherein the relative grain angles of said certain and said other laminations extending around the bend of said stack and into said striking body portion.